(12) United States Patent
Jiang et al.

(10) Patent No.: US 12,430,780 B2
(45) Date of Patent: Sep. 30, 2025

(54) COMPUTER VISION BASED WIDE-AREA SNOW/WATER LEVEL ESTIMATION USING DISPARITY MAP

(71) Applicant: NEC Laboratories America, Inc., Princeton, NJ (US)

(72) Inventors: Zhuocheng Jiang, Plainsboro, NJ (US); Yue Tian, Princeton, NJ (US); Yangmin Ding, East Brunswick, NJ (US); Sarper Ozharar, Pennington, NJ (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 327 days.

(21) Appl. No.: 18/319,476

(22) Filed: May 17, 2023

(65) Prior Publication Data

US 2023/0377179 A1 Nov. 23, 2023

Related U.S. Application Data

(60) Provisional application No. 63/343,713, filed on May 19, 2022, provisional application No. 63/343,706, filed on May 19, 2022.

(51) Int. Cl.
*G06T 7/50* (2017.01)
*G06V 10/74* (2022.01)
*H04N 13/207* (2018.01)

(52) U.S. Cl.
CPC .............. *G06T 7/50* (2017.01); *G06V 10/761* (2022.01); *H04N 13/207* (2018.05); *G06T 2207/20084* (2013.01); *G06T 2207/20228* (2013.01)

(58) Field of Classification Search
CPC ............ G06T 7/50; G06T 2207/20084; G06T 2207/20228; G06V 10/761; G06V 10/82; G06V 20/52; H04N 13/207; H04N 13/204; H04N 13/239; H04N 2013/0074; H04N 2013/0081
See application file for complete search history.

(56) References Cited

U.S. PATENT DOCUMENTS 10,182,225 B1 * 1/2019 Cui .................... G06V 10/30
10,497,129 B1 * 12/2019 Cui ........................ H04N 23/81
(Continued)

OTHER PUBLICATIONS

Rizk H, Nishimur Y, Yamaguchi H, Higashino T. "Drone-Based Water Level Detection in Flood Disasters." Int J Environ Res Public Health. Dec. 26, 2021;19(1):237. doi: 10.3390/ijerph 19010237. PMID: 35010497; PMCID: PMC8744884. (Year: 2021).*
(Continued)

*Primary Examiner* — Wesley J Tucker
(74) *Attorney, Agent, or Firm* — Joseph Kolodka

(57) ABSTRACT

Computer vision based, wide-area snow/water level estimation methods using disparity maps. In one embodiment our method provides rich depth-information using a stereo camera and image processing. Scene images at normal and snow/rain weather conditions are obtained by a double-lens stereo camera and a disparity map is generated from the scene images at left and right lenses using a self-supervised deep convolutional network. In another embodiment, our method uses a single point snow/water level sensor, a stationary monocular camera to measure snow/water levels covering a wide area.

5 Claims, 7 Drawing Sheets

(56) References Cited

U.S. PATENT DOCUMENTS

| | | | |
|---|---|---|---|
| 10,725,438 B1* | 7/2020 | Marsousi | G06V 10/25 |
| 11,900,668 B2* | 2/2024 | Biancale | G01P 15/032 |
| 2020/0202556 A1* | 6/2020 | Maehara | G06T 7/73 |
| 2021/0019521 A1* | 1/2021 | Park | G05D 1/2464 |
| 2023/0143446 A1* | 5/2023 | Schönlieb-Stalzer | G06V 10/147 |
| | | | 345/426 |
| 2024/0233169 A1* | 7/2024 | Matsumoto | G06T 7/00 |
| 2025/0065900 A1* | 2/2025 | Gideon | B60W 60/001 |

OTHER PUBLICATIONS

Jingru Li, Ruying Cai, Yi Tan, Haijun Zhou, Abdul-Manan Sadick, Wenchi Shou, Xiaoling Wang, "Automatic detection of actual water depth of urban floods from social media images," Measurement, vol. 216, 2023 (Year: 2023).*

* cited by examiner

COMPUTER VISION BASED WIDE-AREA SNOW/WATER LEVEL ESTIMATION USING DISPARITY MAP

CROSS-REFERENCE TO RELATED APPLICATIONS

This application claims the benefit of U.S. Provisional Patent Application Ser. No. 63/343,706 filed May 19, 2022, and U.S. Provisional Patent Application Ser. No. 63/343,713 filed May 19, 2022, the entire contents of each of which are incorporated by reference as if set forth at length herein.

FIELD OF THE INVENTION

This application relates generally to environmental monitoring. More particularly, it pertains to computer vision based, wide-area snow/water level estimation using disparity maps.

BACKGROUND OF THE INVENTION

The ability to monitor environmental conditions and in particular road/highway conditions in inclement weather is of critical importance to maintain highway safety. Contemporary methods oftentimes employ ultrasonic, RF, or laser-based sensors to measure a distance from a sensor head to the underlaying ground/road surface and monitor distance changes after snow or water events. Such methods however, tend to monitor only a single point and are cost-inefficient to deploy across a wide area.

SUMMARY OF THE INVENTION

An advance in the art is made according to aspects of the present disclosure directed to computer vision based, wide-area snow/water level estimation using disparity maps.

Viewed from one aspect, our inventive system and method provides an affordable and low power consumption solution for wide-area snow/water level estimation. It provides rich depth-information using a stereo camera and image processing. Scene images at normal and snow/rain weather conditions are obtained by a double-lens stereo camera and a disparity map is generated from the scene images at left and right lenses using a self-supervised deep convolutional network. Since the disparity map reveals depth information, an absolute distance between the camera and any locations in the scene can be determined using intrinsic camera parameters. Consequently, by analyzing the absolute distance in the normal and snow/rain weather, our systems and methods can estimate the snow/water level for every location in the scenes.

In sharp contrast to the prior art, our system and method according to aspects of the present disclosure provides a sensor-free solution for snow/water level estimation solely based on the stereo camera images, which significantly reduces its cost and maintenance. Additionally, our computer vision-based solution determines snow/water levels from disparity maps in normal and snow/water conditions, such disparity maps being advantageously generated by a self-supervised deep learning model.

Viewed from another aspect, our inventive system and method uses a single point snow/water level sensor (regular ultrasonic or RF or laser snow/water level sensor), a stationary monocular camera (regular traffic camera or surveillance camera) and data processing method to measure snow/water levels covering a wide area. The stationary monocular camera is used to generate disparity maps of a same scene at different times and a snow/water level sensor is used to measure the snow/water level at a fixed location in the camera's field of view (FOV) at different times. The data processing method is applied and converts the disparity maps into depth maps by using the snow/water level readings at the fixed location. Consequently, all the snow/water level at each location in the camera's FOV can be read from the depth maps.

With this additional aspect, the snow/water level readings at a single point are used to convert disparity maps into depth maps by our inventive data processing method. Thus, the snow/water level of everything point on the depth map is obtained and only a single snow/water level sensor is required to monitor a wide area. Furthermore, only one monocular camera is required to determine a depth map over a wide area.

DETAILED DESCRIPTION OF THE INVENTION

Figure 1:
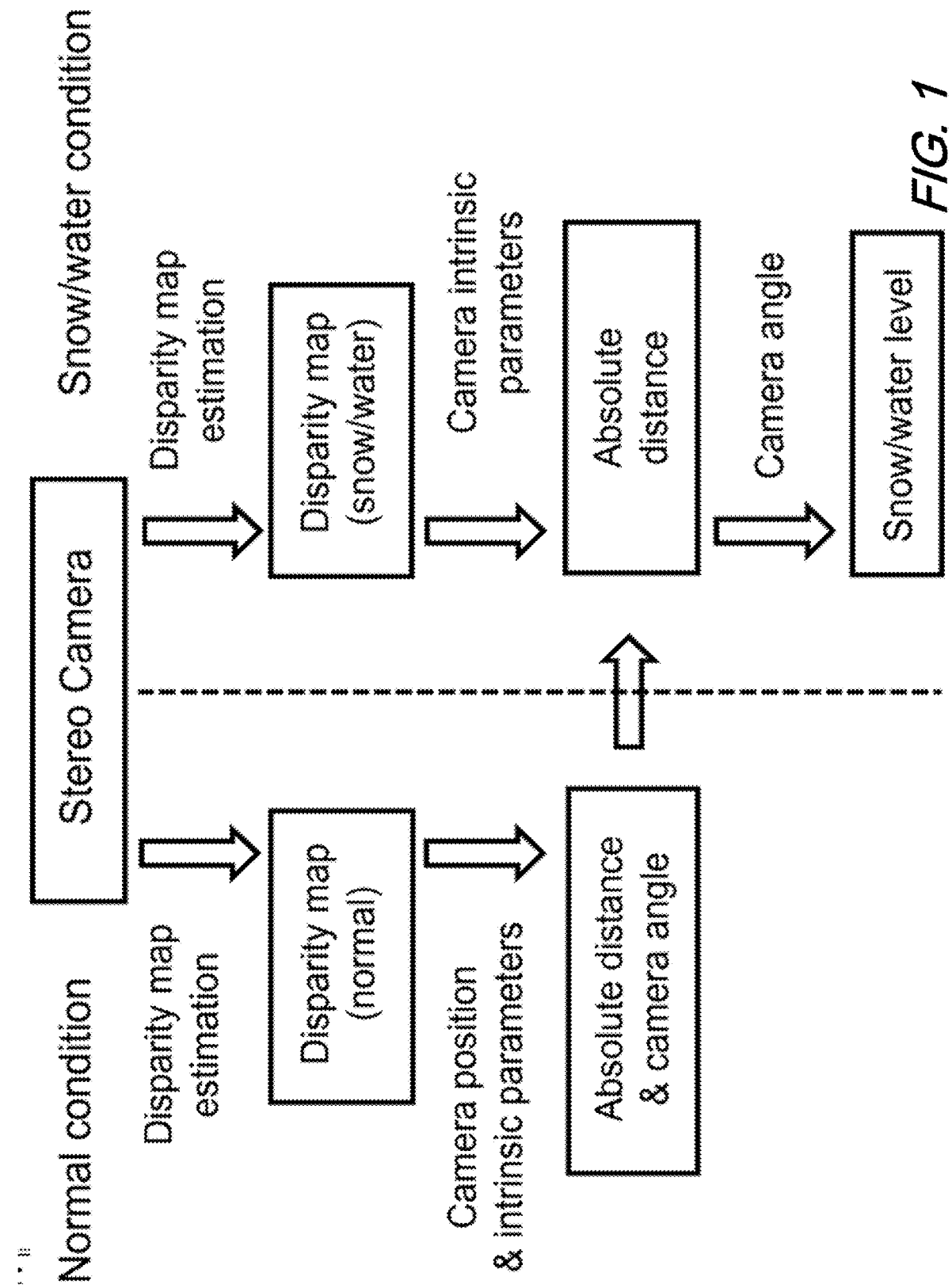
FIG. 1 is a flow diagram showing an illustrative operation of a stereo camera, computer vision based wide area snow/water depth estimation using disparity maps according to aspects of the present disclosure.

The following merely illustrates the principles of this disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor (s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS comprising the drawing are not drawn to scale.

Stereo Camera

FIG. 1 is a flow diagram showing an illustrative operation of a stereo camera, computer vision based wide area snow/water depth estimation using disparity maps according to aspects of the present disclosure. To estimate snow/water depth information over a wide area, two pieces of information are needed: Disparity maps from normal conditions and a disparity map from snow/water accumulated conditions.

First, a stereo camera is mounted on a pole for image collection. Note that the camera height and position should be kept identical when capturing images in different weather conditions. Second, a self-supervised deep learning model is used for disparity map estimation. Images from both the left and right lenses of the stereo camera are used as input to the model to generate a detailed disparity map. From disparity information, one can generate absolute distance information (distance between the camera and the road surface) using intrinsic camera parameters (baseline and focal).

In our system according to the present disclosure, the disparity in a normal condition is used as a reference map to determine the camera angle for different locations. Since the camera position is not changed for different weather conditions, the determined camera angles for the normal condition are integrated with the disparity map for the snow/water condition and snow/water level detection.

Figure 2:
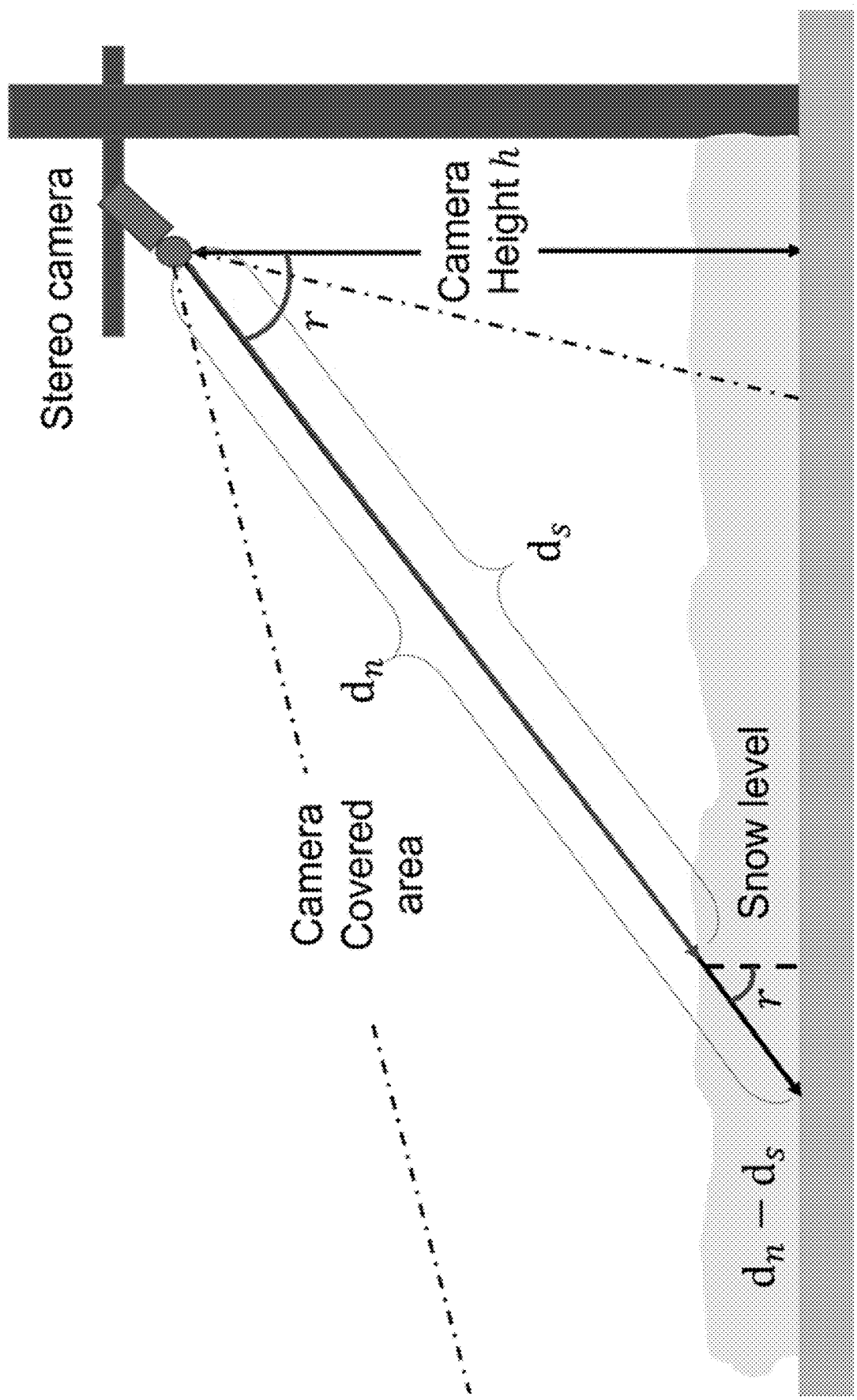
FIG. 2. is a schematic diagram showing an illustrative arrangement for stereo camera, computer vision based wide area snow/water depth estimation using disparity maps according to aspects of the present disclosure.

FIG. 2. is a schematic diagram showing an illustrative arrangement for stereo camera, computer vision based wide area snow/water depth estimation using disparity maps according to aspects of the present disclosure. Using this figure as an illustrative reference, we can establish an operational method according to aspects of the present disclosure. Note that while we have depicted this operation as a streetside scenario, it is applicable to many others as well.

1: Mount a stereo camera on a pole near street, to capture images from both lenses of the stereo camera. Note that images are collected both during normal weather and snow/rain weather conditions.

2: A deep neural network is applied to the captured images to generate a disparity map, which reveals 2-D pixel-level depth relation information for a given scene. The disparity map is then transformed to an absolute distance between the stereo camera and the surface of the ground.

The relationship between absolute distance and disparity can be written as:

Absolute distance=Baseline*Focal/Disparity, where the baseline is the distance between two lenses, and focal length is the distance between the lens and the image sensor. Figures below show the input image and its disparity map.

3: The absolute distances estimated in the normal weather condition are used to determine the angles of the camera for each location in a scene. For example, the angle r for a specific spot can be determined from the absolute distance $d_n$ and the camera height h. Thus, for each location in the scene, a parameter set $(d_n, r)$ can be estimated.

4: For the snow/water accumulated condition, the absolute distance can be measured using the same way introduced in step (2), above. Note that the absolute distance $d_s$ denoted as the distance between camera and the snow surface. Combined with the estimated angle r in the normal condition from step (3), above, a new parameter set $(d_n-d_s, r)$ can be generated to obtain the snow/water level for each location in the scene.

Figure 3:
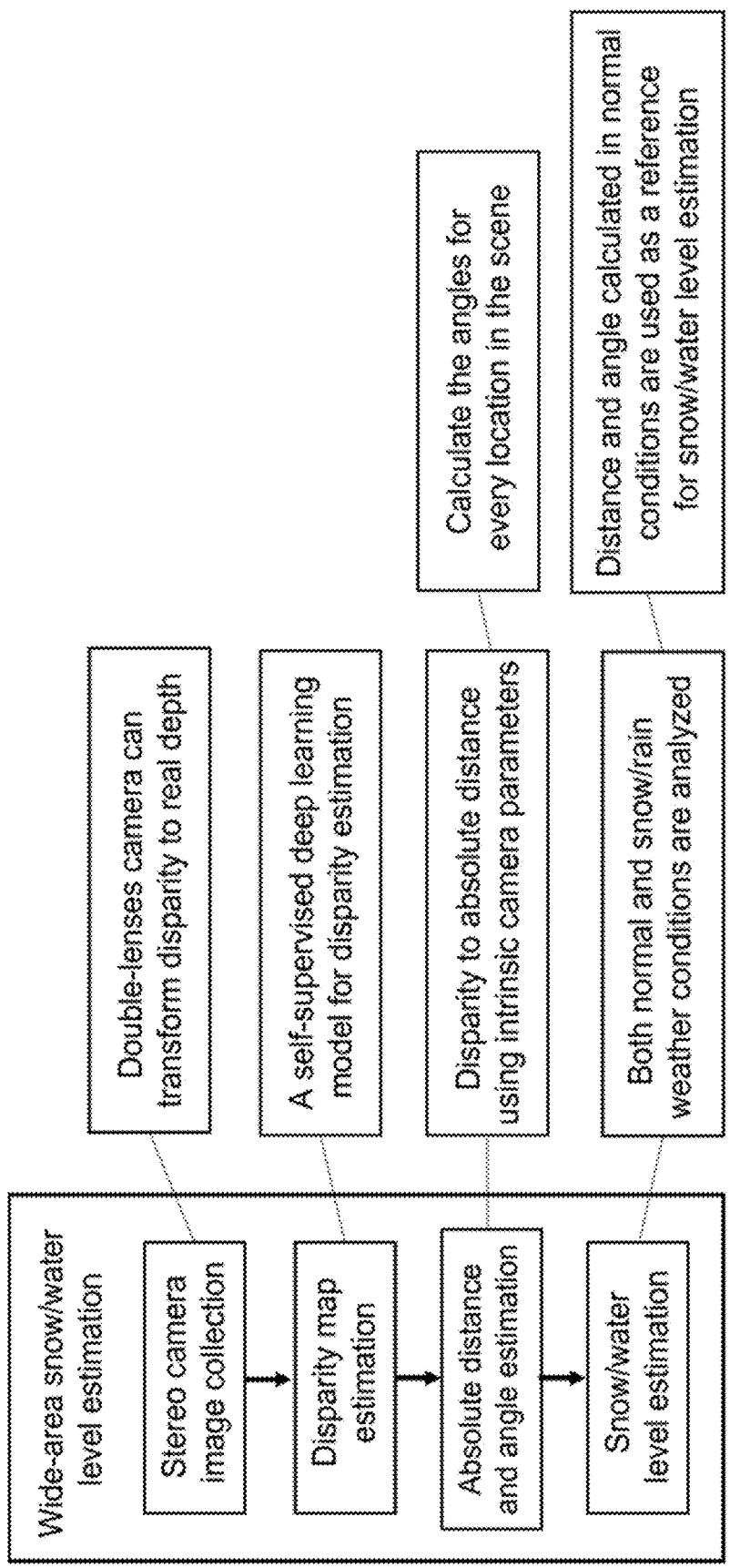
FIG. 3 is a schematic diagram showing illustrative features for stereo camera, computer vision based wide area snow/water depth estimation using disparity maps according to aspects of the present disclosure.

FIG. 3 is a schematic diagram showing illustrative features for stereo camera, computer vision based wide area snow/water depth estimation using disparity maps according to aspects of the present disclosure.

Monocular Camera

Figure 4:
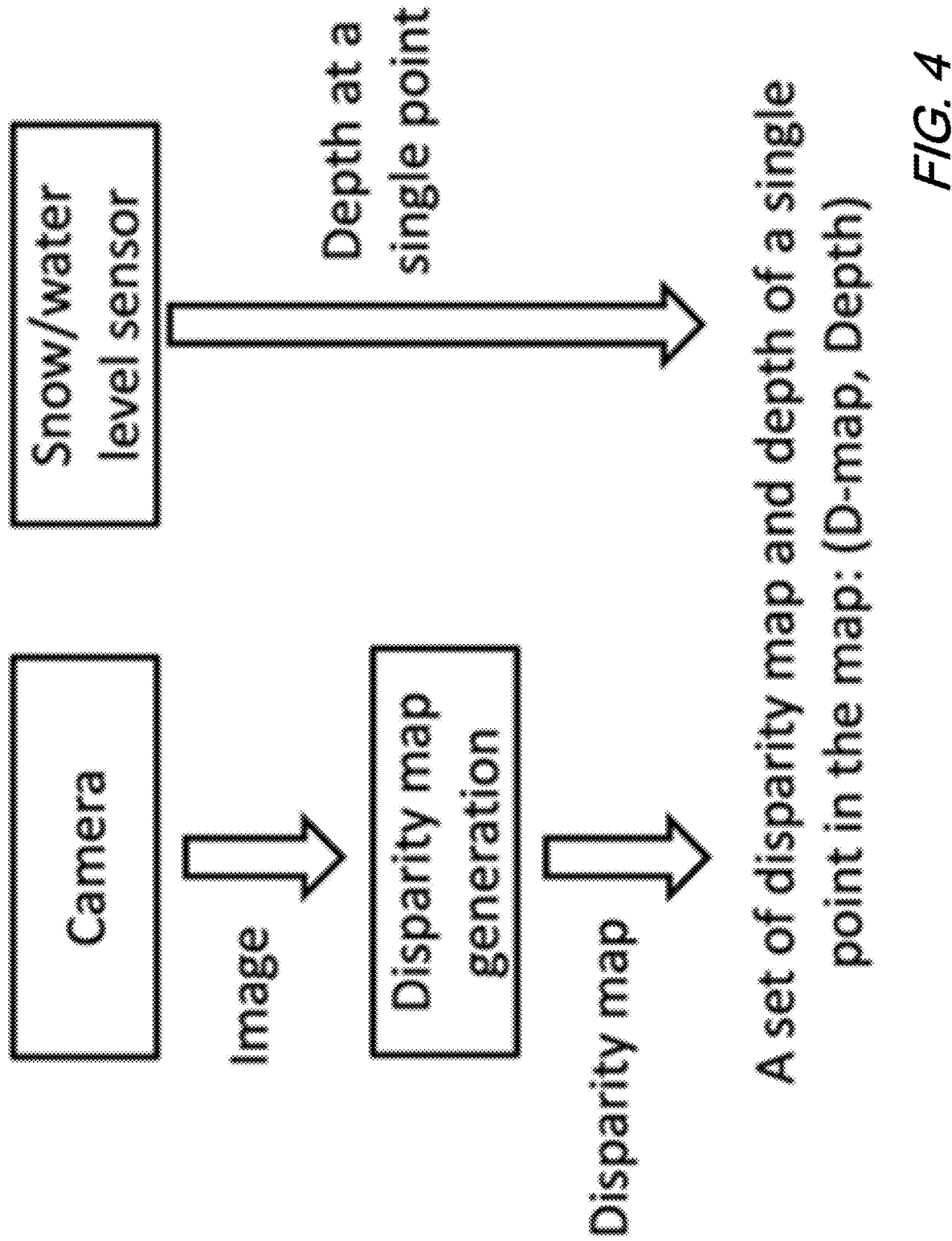
FIG. 4 is a flow diagram showing an illustrative operation of a mono camera, computer vision based wide area snow/water depth estimation using disparity maps according to aspects of the present disclosure according to aspects of the present disclosure.
Figure 5:
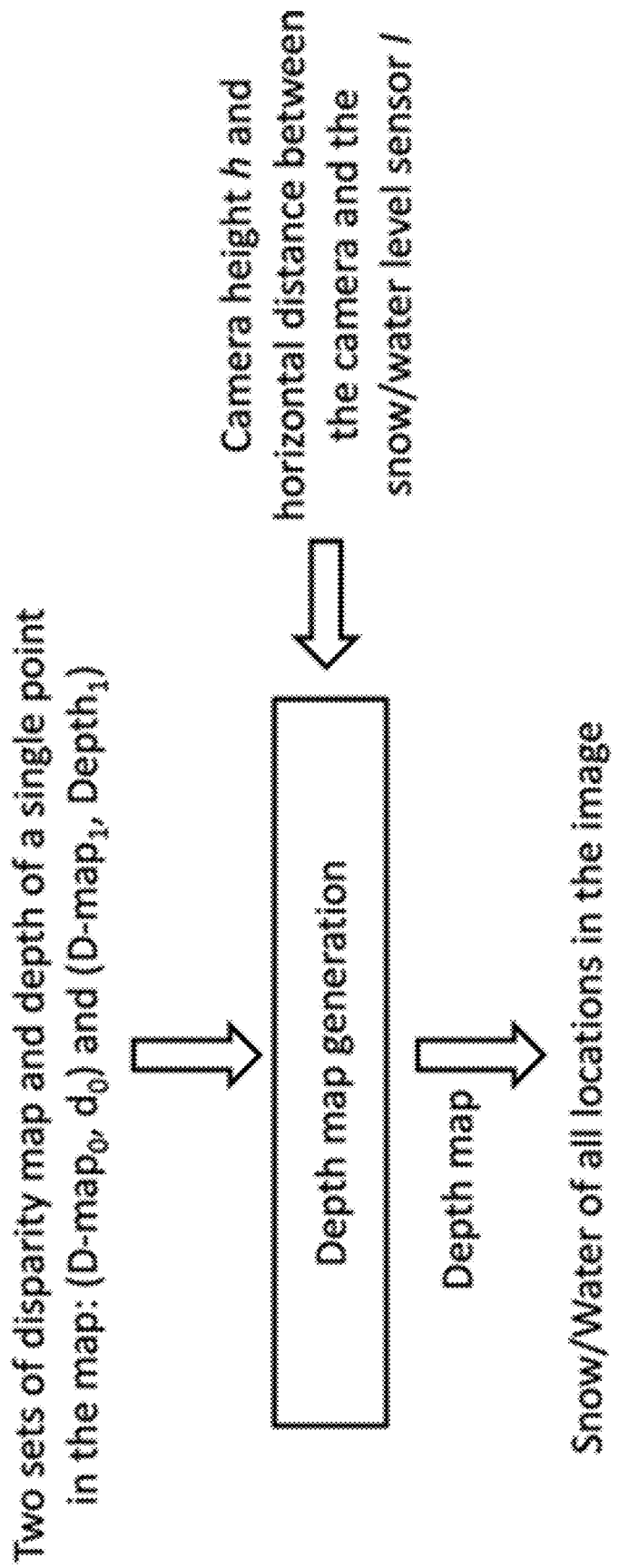
FIG. 5 is a flow diagram showing an additional illustrative operation of a mono camera, computer vision based wide area snow/water depth estimation using disparity maps according to aspects of the present disclosure according to aspects of the present disclosure.

FIG. 4 is a flow diagram showing an illustrative operation of a mono camera, computer vision based wide area snow/water depth estimation using disparity maps according to aspects of the present disclosure according to aspects of the present disclosure. FIG. 5 is a flow diagram showing an additional illustrative operation of a mono camera, computer vision based wide area snow/water depth estimation using disparity maps according to aspects of the present disclosure according to aspects of the present disclosure. With simultaneous reference to these figures we note the following.

With this alternative aspect, we use a stationary monocular camera to measure the snow/water level of every location in an image, by generating a depth map of the image. Generation of the depth map involves: 1) collection of a disparity map and depth data set, and 2) generation of depth map, as shown in the figures.

First, to collect a valid disparity map and depth data set, the monocular camera and point snow/water level sensor operate simultaneously to record an image and a depth measurement separately. Note that the measurement location of the snow/water level sensor is within the image. Next, a deep learning model for disparity map generation converts the image into a disparity map covering the same range as the image. As a result, a single set of data, including a disparity map and a depth measurement of one point on this disparity map, annotated as (D-map, d) is produced.

Second, to generate a depth map at a desired time (e.g., with snow or water covering the ground surface), the depth map generation uses two sets of data (D-map, d) with different depth measurements. One set is at the desired time or current time—$(D\text{-}map_1, d_1)$, while the other set is from a historical time with no or different snow/water depth—$(D\text{-}map_0, d_0)$, with $d_1 \neq d_0$. Eventually, our data processing process determines the relationship between the disparity map and depth map by using $(D\text{-}map_1, d_1)$ and $(D\text{-}map_0, d_0)$, and known camera height h and horizontal distance between the camera and the snow/water level sensor. Therefore, the disparity map can be converted into a depth map, and consequently the snow/water level at every location in the FOV of the camera can be read from the depth map.

Figure 6:
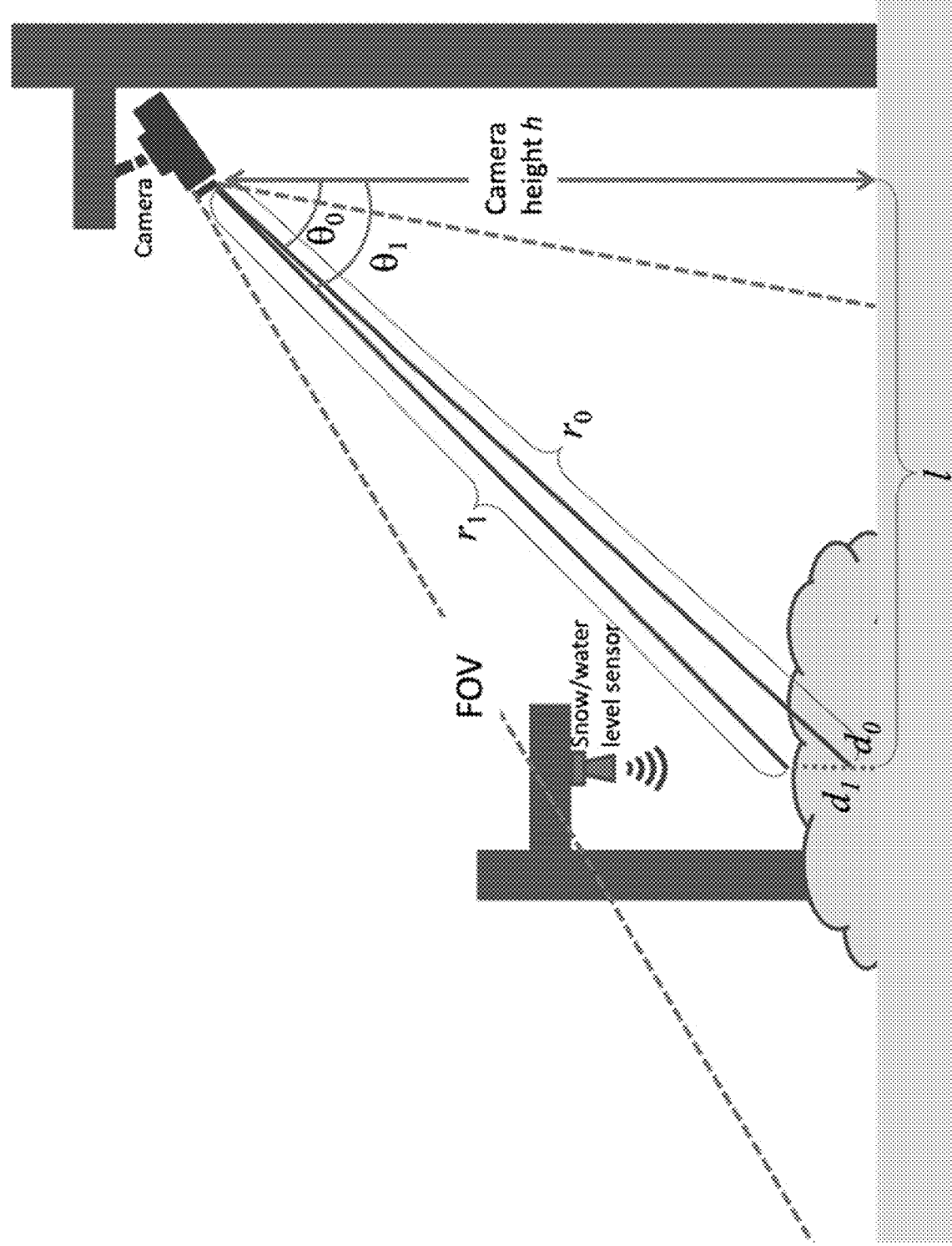
FIG. 6. is a schematic diagram showing an illustrative arrangement for mono camera, computer vision based wide area snow/water depth estimation using disparity maps according to aspects of the present disclosure.

FIG. 6. is a schematic diagram showing an illustrative arrangement for mono camera, computer vision based wide area snow/water depth estimation using disparity maps according to aspects of the present disclosure. With reference to this figure, an operational process according to the present disclosure is described as follows.

Step 1) Install a stationary monocular camera, for example, a. regular traffic camera with a FOV to cover the target area. Install a point snow/water level sensor measuring a location within the camera FOV. Camera height h and horizontal distance between the camera and the snow/water level sensor/are known.

Step 2) A deep neural network is applied to convert a camera image to a corresponding disparity map, which represents the 2-D pixel-level distance (distance from the object on the pixel to the camera) relation information for the source image. The relationship between absolute distance and disparity follows the equation:

Absolute distance=$F$×Disparity+$C$, where F is a constant scaling factor and C is a constant offset. Note that F and C are fixed values for the images/disparity maps from the same stationary camera (at fixed location and view angle).

Step 3) Convert disparity map to a depth map. Capture two sets of images and snow/water level measurements under different snow/water level conditions to get two set of disparity maps and depths, i.e. (D-map$_0$, d$_0$) and (D-map$_1$, d$_1$) where d$_1 \neq$d$_0$.

Using known h and l, we obtain $\theta_0$=arctan(l/(h−d$_0$)), $\theta_1$=arctan(l/(h−d$_1$)), $r_0=\sqrt{l^2+(h-d_0)^2}$ and $\sqrt{l^2+(h-d_1)_2}$. By searching location $\theta_0$ and $\theta_1$ on D-map$_0$ and D-map$_1$ respectively, the disparity D$_0$ and D$_1$ corresponding to absolute distance r$_0$ and r$_1$ are obtained. By substituting r$_0$, r$_1$, D$_0$ and D$_1$ into the equation in step 2, we can derive constant F and C. Thus, with F and C known, the absolute distance r of any point on a disparity map can be obtained. For any point on a disparity map, since its $\theta$ and h are also known, its depth d can be obtained by d=h−r×cos $\theta$. As a result, the disparity map is converted into a depth map.

Step 4) From the depth map generated from step 3, we can determine the depth value of any locations in the FOV of the camera. Therefore, the snow/water level across a wide area covered by the FOV of the camera can be monitored.

Figure 7:
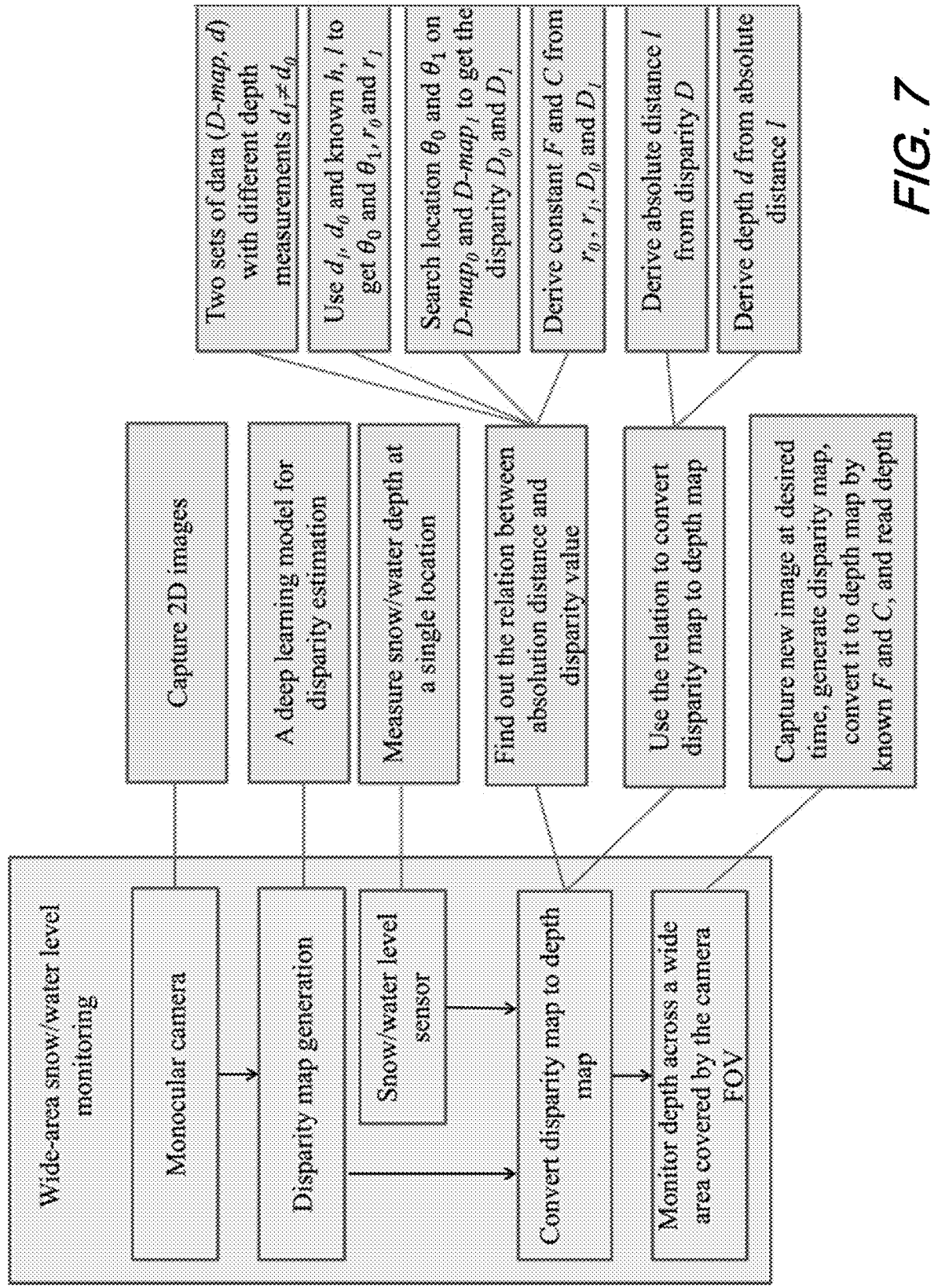
FIG. 7 is a schematic diagram showing illustrative features for mono camera, computer vision based wide area snow/water depth estimation using disparity maps according to aspects of the present disclosure.

FIG. 7 is a schematic diagram showing illustrative features for mono camera, computer vision based wide area snow/water depth estimation using disparity maps according to aspects of the present disclosure.

At this point, while we have presented this disclosure using some specific examples, those skilled in the art will recognize that our teachings are not so limited. Accordingly, this disclosure should be only limited by the scope of the claims attached hereto.

The invention claimed is:

1. A computer vision based wide-area snow/water level estimation method using disparity maps, the method:
   providing a stereo camera at an elevated height h from the ground, the stereo camera configured to generate images of a scene;
   operating the stereo camera during normal and snow/rain weather conditions and collecting images of the scene generated during the normal and snow/rain weather conditions;
   using a deep neural network, generating a disparity map that reveals 2D pixel-level depth relation information for the scene;
   transforming the disparity map depth-relation information to an absolute distance between the stereo camera and the surface of the ground;
   continuously operating the stereo camera during snow/rain weather conditions to generate inclement weather images; and
   determining the snow/water level at locations in the inclement weather images.

2. The method according to claim 1 wherein the deep neural network is a self-supervised deep learning neural network.

3. The method according to claim 2 wherein the stereo camera includes a left and a right lens and both images generated at the left and right lens are used as input to a model to generate a detailed disparity map.

4. A computer vision based wide-area snow/water level estimation method using disparity maps, the method:
   providing a monocular camera at an elevated height h from the ground, the monocular camera configured to generate images of a scene;
   providing a point snow/water level sensor located within the scene imaged by the monocular camera;
   operating the camera during normal and snow/rain weather conditions and collecting images of the scene generated during the normal and snow/rain weather conditions, and simultaneously operating the point snow/water level sensor during the normal and snow/rain weather conditions
   using a deep neural network, generating a disparity map for the scene;
   transforming the disparity map depth-relation information to an absolute distance between the stereo camera and the surface of the ground;
   continuously operating the monocular camera during snow/rain weather conditions to generate an inclement weather image; and
   determining, from the disparity map and a depth measured by the point snow/water level sensor, the snow/water level at every location in the inclement weather image.

5. The method according to claim 1 wherein the deep neural network is a self-supervised deep learning neural network.

* * * * *